(12) United States Patent
Niedens et al.

(10) Patent No.: US 11,867,115 B2
(45) Date of Patent: Jan. 9, 2024

(54) TURBOCHARGER ACTUATOR ARRANGEMENT

(71) Applicant: BorgWarner Inc., Auburn Hills, MI (US)

(72) Inventors: Johann Niedens, Frankenthal (DE); Timo Maskow, Hettenleidelheim (DE); Mustapha Marouane, Kirchheimbolande (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/686,752

(22) Filed: Mar. 4, 2022

(65) Prior Publication Data

US 2023/0184161 A1 Jun. 15, 2023

(30) Foreign Application Priority Data

Dec. 13, 2021 (DE) .................. 202021106 759.4

(51) Int. Cl.
| | | |
|---|---|---|
| *F02B 37/12* | (2006.01) | |
| *F01D 17/10* | (2006.01) | |
| *F02B 37/18* | (2006.01) | |
| *F02B 37/16* | (2006.01) | |
| *F02B 37/24* | (2006.01) | |

(52) U.S. Cl.
CPC ............ *F02B 37/12* (2013.01); *F01D 17/105* (2013.01); *F02B 37/16* (2013.01); *F02B 37/18* (2013.01); *F02B 37/186* (2013.01); *F02B 37/24* (2013.01)

(58) Field of Classification Search
CPC ...... F02B 37/12; F02B 37/186; F01D 17/105; F16C 11/04; F16C 11/045; F16C 11/12; F05D 2220/40; F05D 2220/226052
See application file for complete search history.

(56) References Cited

U.S. PATENT DOCUMENTS

| | | | |
|---|---|---|---|
| 2012/0216534 A1* | 8/2012 | Werstat ................. | F02B 37/186 60/611 |
| 2013/0139502 A1* | 6/2013 | Chu ...................... | F02B 37/186 411/545 |
| 2015/0118027 A1* | 4/2015 | Zieboli ................. | F02B 37/186 415/145 |
| 2018/0320582 A1* | 11/2018 | Folk ....................... | F02B 77/13 |

* cited by examiner

*Primary Examiner* — Loren C Edwards
(74) *Attorney, Agent, or Firm* — Howard & Howard Attorneys PLLC

(57) ABSTRACT

A turbocharger actuator arrangement for a turbocharger includes a movable actuator operating lever, a control rod, and a wave spring. More specifically, the control rod is couplable to a setting element of the turbocharger and is connected to the actuator operating lever by means of a bolt such that the control rod is arranged to be rotatable relative to the actuator operating lever. The bolt extends from the actuator operating lever through an opening in an end region of the control rod and through the wave spring. As such, the control rod and the wave spring are arranged between the actuator operating lever and a bolt securing means, which is arranged at an end region of the bolt that is averted from the actuator operating lever.

9 Claims, 3 Drawing Sheets

TURBOCHARGER ACTUATOR ARRANGEMENT

CROSS-REFERENCE TO RELATED APPLICATIONS

This application claims priority pursuant to 35 U.S.C. 119(a) to German Patent Application No. 202021106759.4, filed Dec. 13, 2021, which application is incorporated herein by reference in its entirety.

BACKGROUND

The invention relates to a turbocharger actuator arrangement with an actuator operating lever and with a control rod.

An actuator for a turbocharger controls the operation of a turbocharger by adjusting, via a control rod, a setting element of the turbocharger, which setting element has an influence on the operation of the turbocharger. Such an actuator is also referred to as a setting drive. The turbocharger may for example be configured as a turbocharger for an internal combustion engine or a hydrogen cell unit of a vehicle.

In a turbocharger actuator arrangement, the control rod and an operating lever of the actuator are coupled such that the control rod is arranged so as to be movable relative to the operating lever. For example, the operating lever and an end region of the control rod may be rotatably connected by means of a bolt. This is however associated with axial and radial play and an undesired movement of the components over and above the rotational movement, such that generation of noise, rattling and wear can occur during operation. A crowned bolt in particular is sensitive to wear. The wear can be reduced through complex heat treatment of the components.

SUMMARY

It is the object to provide an improved turbocharger actuator arrangement.

The object is achieved by means of a turbocharger actuator arrangement having the features of claim 1. The turbocharger actuator arrangement comprises a movable actuator operating lever, a control rod which is couplable to a setting element of a turbocharger and which is connected by means of a bolt to the actuator operating lever, such that the control rod is arranged so as to be rotatable relative to the actuator operating lever, and a wave spring. The bolt extends from the actuator operating lever through an opening in an end region of the control rod and through the wave spring, such that the control rod and the wave spring are arranged between the actuator operating lever and a bolt securing means, which is arranged at an end region of the bolt which is averted from the actuator operating lever.

The turbocharger actuator arrangement is an actuator arrangement for a turbocharger. This actuator arrangement provides an actuator operating lever as a movable drive part of an actuator, which actuator operating lever is couplable via a control rod to a setting element of a turbocharger in order to transmit the movement of the actuator operating lever to the setting element and influence the operation of the turbocharger by way of the movement or position of the setting element.

The actuator operating lever is a movable, in particular rotatable, component of an actuator for adjusting the operation of the turbocharger. The movement of the actuator operating lever is transmitted via the control rod to the setting element of the turbocharger, by way of the movement or position of which a targeted intervention is made in the operation of the turbocharger. The control rod, which can also be referred to as guide element or coupling rod, is coupled between the actuator operating lever and the setting element, wherein this coupling is realized at the actuator operating lever by means of the bolt, and may be realized at the setting element by connecting means or further components.

The control rod is an elongate machine element, the ends of which are couplable to the actuator operating lever and to the setting element, such that the movement of the actuator operating lever can be transmitted to the setting element. The control rod is commonly rigid, and may be of single-part or multi-part form. In the case of a multi-part control rod, end pieces may be provided, by means of which the length of the control rod can be adapted. In the end region facing toward the actuator operating lever, the control rod has an opening for receiving the bolt. This is also referred to as an eyelet.

The wave spring is composed of deformable material, in particular wire, running in a ring shape, wherein the wire has, along its direction of extent, an undulating form with alternating undulation peaks and troughs in an axial direction. The wave spring may be formed for example from flat wire, round wire or spring sheet. In one exemplary embodiment, round wire is deformed into flat wire during the course of the production of the wave spring. A single-layer wave spring may have a closed ring shape. Alternatively, a gap is provided between the ends thereof, or the ends overlap. Multi-layer wave springs have multiple layers of helically running undulating wire. In the case of multi-layer wave springs, the undulation troughs of one layer lie on the undulation peaks of the layer situated underneath. Alternatively, the multi-layer wave spring comprises multiple closed rings, which are arranged one on top of the other such that the undulation peaks of one ring make contact with the undulation troughs of the ring situated above. The end windings of a multi-layer wave spring may be planar, that is to say without undulations, and arranged parallel to one another, resulting in a larger contact area.

The bolt securing means prevents the detachment of the components that are held together by the bolt, by virtue of the bolt securing means projecting beyond the bolt such that the control rod and the wave spring can no longer be stripped from the bolt.

For the joining-together of the control rod with the actuator operating lever such that the components are rotatable, the components have a movement clearance, so-called play, which results from the manufacturing process and is necessitated by the application and which also allows the rotational movement. The wave spring with one or more layers reduces the play between the control rod and bolt on the actuator side, because the wave spring, by way of its preload, significantly restricts the movement that is possible between the control rod and the bolt securing means or the actuator operating lever but allows the rotational movement between the components. The actuator side is the so-called cold side of the control rod, because the generation of heat is less than that at that side of the control rod which faces toward the turbocharger. The axial play is reduced by the axially acting spring action. In conjunction with the wave spring, the radial relative movement of control rod and bolt is at least dampened, and at best prevented, by friction. As a result of the reduced play, noises, in particular rattling and/or wear, during the operation of the turbocharger and of the actuator are at least reduced or eliminated. Altogether, the vibrations and the resulting effects, referred to as "noise, vibration and harshness" (also abbreviated to "NVH"), are reduced. Depending on the application, a special heat treatment of the components may no longer be imperatively necessary, such that the described turbocharger actuator arrangement would in such a case also be associated with a reduction in complexity and costs.

The wave spring bridges the gap in the articulated connection formed by the bolt. The wave spring may be arranged between the control rod and the bolt securing means or between the control rod and the actuator operating lever. During the assembly process, the bolt provides a centering action, in particular for the wave spring. For this purpose, the outer diameter and the shape of the bolt correspond to the inner diameter and the shape of the opening of the wave spring. Aside from the wave spring and the mounting thereof onto the bolt, the complexity of the described turbocharger actuator arrangement is no greater than the complexity of a conventional turbocharger actuator arrangement. In particular, no further expensive upgrade, or additional connecting means, is necessary. The wave spring can, by way of suitable shaping and stiffness, be adapted to operating requirements of the turbocharger actuator arrangement.

In one embodiment, that end region of the bolt which is averted from the actuator operating lever has a groove, and the bolt securing means is formed as a securing ring that engages into the groove. The groove is a radially at least partially encircling trough-like depression in the lateral surface of the bolt, into which the bolt securing means engages. The securing ring advantageously has a ring-segment-shaped or U-shaped basic form with a gap at which the securing ring is pushed into the groove. The securing ring is held by way of its spring force in the groove and thus forms a form-fitting connection with the bolt in an axial direction.

In one embodiment, the bolt is fixedly connected to the actuator operating lever. The fixed connection may be formed for example by way of a press-fit connection or a welded connection or by virtue of the actuator operating lever and bolt being formed integrally as a single component.

In one embodiment, the bolt has a first region adjacent to the actuator operating lever and a second region between the first region and the end region. The second region runs through the opening of the control rod, and the first region and the end region are outside the opening of the control rod. A diameter of the second region is advantageously smaller than a diameter of the first region, such that the control rod is supported on the first region, and direct contact with the actuator operating lever, and associated increased wear, are avoided.

In one embodiment, the first region runs through the wave spring, such that the latter is arranged between the control rod and the actuator operating lever. In this case, the first region serves both for supporting the control rod and for centering the wave spring. The diameter of the second region corresponds to the diameter of the wave spring, and the diameter of the first region corresponds to the diameter of the opening of the control rod, such that both the wave spring and a control rod can be placed onto the bolt. In the second region, there is still enough play that the control rod is movable. The first and/or the second region may have a cylindrical or crowned shape. The crowned shape corresponds to a barrel-like roll form with a diameter that decreases toward the end sides. This makes it possible for the components to be placed onto the bolt more easily. Other shapes, in particular with rounded or beveled edges at that side of the first and/or second region which is averted from the actuator operating lever, are conceivable. By means of the shaping of the bolt, be it cylindrical, crowned or of some other form, the components are centered and guided into their position during the assembly process.

One embodiment of the turbocharger actuator arrangement furthermore comprises a turbocharger with a setting element, which has an influence on the operation of the turbocharger, and comprising an actuator with the actuator operating lever, wherein the actuator is configured to control the turbocharger by varying a position of, or moving, the actuator operating lever, the control rod being coupled to a setting element of the turbocharger, such that the variation of the position, or movement, of the actuator operating lever causes a variation of the position, or movement, of the setting element. The setting element is one out of the group comprising a bypass valve, a VTG cartridge and a regulating flap. A bypass valve of an exhaust-gas turbocharger can conduct at least a part of an exhaust-gas flow past the turbine in order to influence the turbine rotational speed. A VTG cartridge in the case of a variable turbine geometry makes it possible for guide vanes at the turbine inlet to be adjusted. A regulating flap may be provided for example in the case of a two-stage turbocharger in order to control the operation of the stages.

BRIEF DESCRIPTION OF THE DRAWINGS

A number of exemplary embodiments will be discussed in more detail below on the basis of the drawing, in which.

In the figures, components that are identical or have the same effect are provided with the same reference designations.

DETAILED DESCRIPTION

Figure 1:
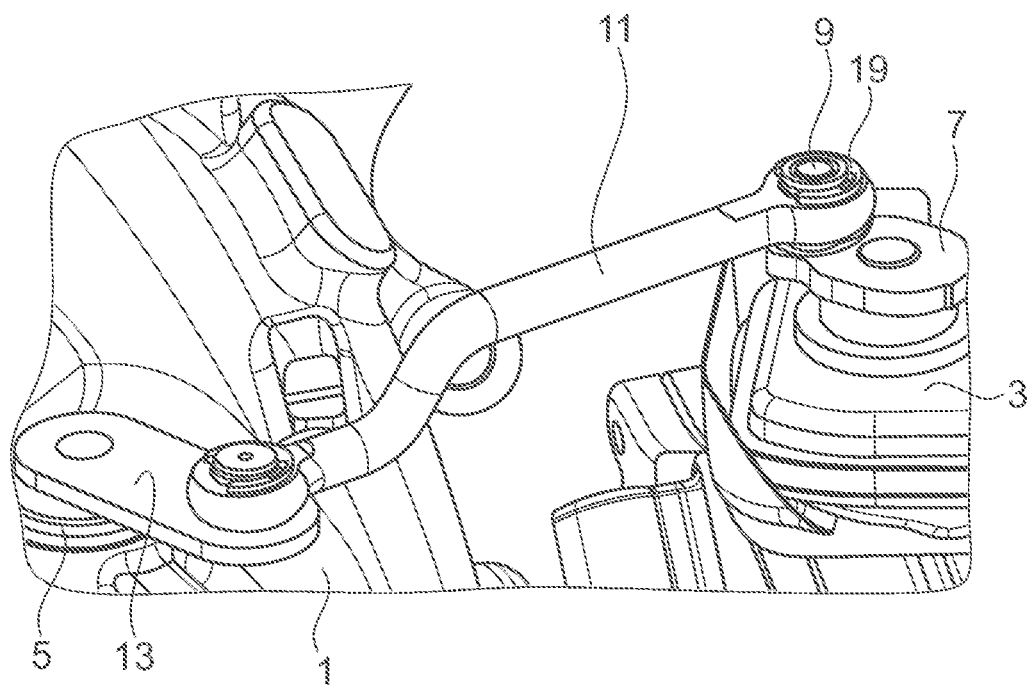
FIG. 1 is a three-dimensional illustration of an exemplary embodiment with a turbocharger and with an actuator.

FIG. 1 is a three-dimensional illustration of an exemplary embodiment with a turbocharger 1 and with an actuator 3. The turbocharger 1 is configured to compress air that is fed to an engine. The turbocharger 1 may for example be configured as an exhaust-gas turbocharger, an electrically assisted turbocharger or an electrically driven turbocharger. The actuator 3 is configured to control the operation of the turbocharger 1 by controlling the position or movement of a component of the turbocharger 1. Such a component is a setting element 5, by means of the movement or position of which a targeted intervention is made in the operation of the turbocharger 1. Such a setting element 5 may for example be configured as a bypass valve or a VTG cartridge or a regulating flap.

The actuator 3 comprises a movable actuator operating lever 7, by means of the movement of which the position of the setting element 5 is varied. In this exemplary embodiment, the actuator operating lever 7 is configured to be rotatable. A bolt 9 is arranged on the actuator operating lever 7 outside the axis of rotation. The bolt 9 commonly runs parallel to the axis of rotation and moves with the actuator operating lever 7. Between the actuator operating lever 7 and the control element 5 of the turbocharger 1, there is coupled a control rod 11, also referred to as guide piece. An end region of the control rod 11 is connected via the bolt 9 to the actuator operating lever 7, such that the control rod 11 is rotatable relative to the actuator operating lever 7. The other end region of the control rod 11 is coupled to the setting element 5 of the turbocharger 1, such that a movement of the control rod 11 is transmitted to the setting element 5. In this exemplary embodiment, the coupling is realized by means of a lever 13, which is connected rotatably to the control rod 11 and is connected to the setting element 5. The actuator 3 controls the turbocharger 1 through movement of the actuator operating lever 7. This movement is transmitted by means of the control rod 11 to the setting element 5, such that the change in position, or movement, of the setting element 5 influences the operation of the turbocharger 1.

Figure 2:
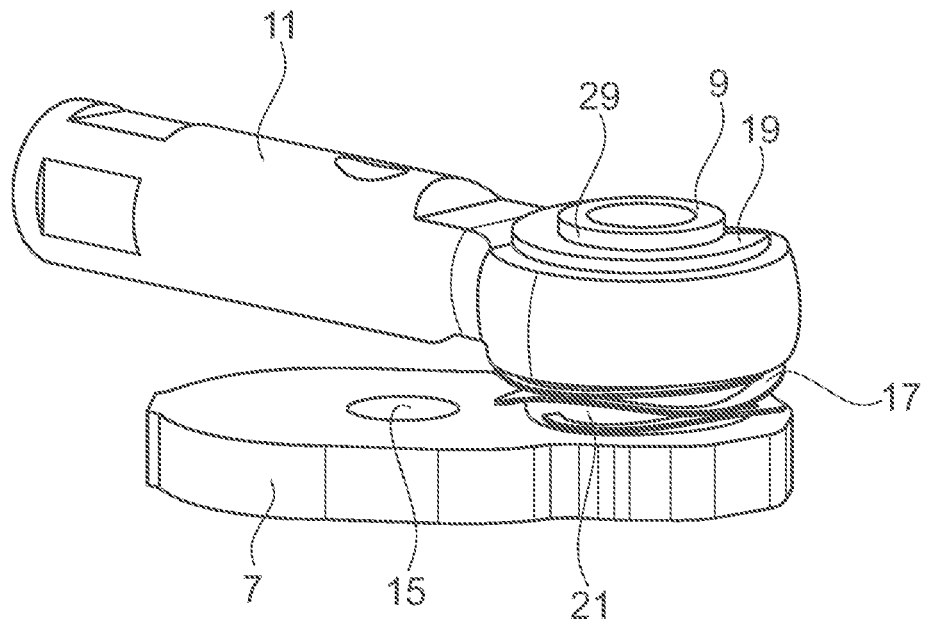
FIG. 2 is a three-dimensional illustration of an exemplary embodiment of a turbocharger actuator arrangement.

FIG. 2 is a three-dimensional illustration of a first exemplary embodiment of a turbocharger actuator arrangement having an actuator operating lever 7 of an actuator 3 and having a control rod 11, the end piece of which is illustrated in FIG. 2. The turbocharger actuator arrangement allows the movement of the actuator operating lever 7 to be transmitted to the control rod 11, which is couplable to the setting element 5, wherein the movement directions of actuator operating lever 7 and setting element 5 commonly differ from one another.

The actuator operating lever 7 has an installation opening 15 in which a shaft of the actuator 3 can be rotationally conjointly installed, such that the actuator operating lever 7 is fastenable rotatably to the actuator 3 and can be set in rotational motion by means of the shaft. The rotation takes place about an axis of rotation running through the shaft. The control rod 11 and the actuator operating lever 7 are connected to one another by means of a bolt 9, such that the control rod 11 is arranged so as to be rotatable about the bolt 9 relative to the actuator operating lever 7.

The bolt 9 is arranged spaced apart from the axis of rotation and extends parallel thereto, such that a rotational movement of the actuator operating lever 7 leads to a movement of the bolt 9 along a circular arc. The bolt 9 is fixedly connected to the actuator operating lever 7. The fixed connection may be formed for example by way of a press-fit connection or a welded connection or by virtue of the actuator operating lever 7 and bolt 9 being formed integrally as one component. The bolt 9, which projects upward from the plane of rotation of the actuator operating lever 7, has a cylindrical basic shape with a step-like cross-sectional widening at the actuator operating lever 7. The cross-sectional widening adjacent to the actuator operating lever 7 is a first region 21 of the bolt 9. The bolt 9 furthermore has an end region 25 at its free end averted from the actuator operating lever 7. Between the end region 25 and the first region 21, there is a second region 27 of the bolt 9.

The bolt 9 extends through an opening, also referred to as a through opening, in the end region of the control rod 11 and through a wave spring 17. The control rod 11 and the wave spring 17 are arranged one above the other, such that the wave spring 17 is arranged between the control rod 11 and the actuator operating lever 7. The first region 21 of the bolt 9 runs through the wave spring 17, and the second region 27 of the bolt 9 runs through the control rod 11.

A bolt securing means 19 is arranged at that end region 25 of the bolt 9 which is averted from the actuator operating lever 7, such that the control rod 11 and the wave spring 11 cannot be pulled off the bolt 9 without the bolt securing means 19 having first been removed. In this exemplary embodiment, the bolt securing means 19 is configured as a securing ring that engages into a radially encircling groove 31 in the end region 25. The engaged securing ring projects beyond the lateral surface of the bolt 9 but also beyond the inner diameter of the opening in the control rod 11 and the wave spring 17. The securing ring has a circular or U-shaped outer contour and has a gap at which the securing ring is pushed over the groove 31 in the end region 25 of the bolt 9, such that the spring stress of the securing ring holds the latter in the groove 31 and forms a form-fitting connection in an axial direction. The inner contour of the ring and the outer contour of the groove 31 may correspond to one another such that the securing ring assumes a specified orientation. For this purpose, it is for example possible for lugs and corresponding depressions to be provided in the contours.

The diameter of the wave spring 17 corresponds to the diameter of the first region 21, such that the wave spring 17 has at most a small amount of radial play and, during the mounting of the wave spring 17 onto the bolt 9 during the assembly process, the bolt 9 has a centering action that guides the wave spring 17 into its specified position. The radial play between the second region 27 and the opening in the control rod 11 is such that the rotational movement between the components is possible.

In this exemplary embodiment, the wave spring 17 is configured as a multi-layer wave spring, the undulating flat wire of which runs in helical fashion. The wave spring 17 runs around the first region 21 and is preloaded between the control rod 11 and the actuator operating lever 7, such that the axial play between the actuator operating lever 7 and the control rod 11 is reduced or even eliminated by virtue of the wave spring 17 pressing the control rod 11 against the bolt securing means 19.

Figure 3:
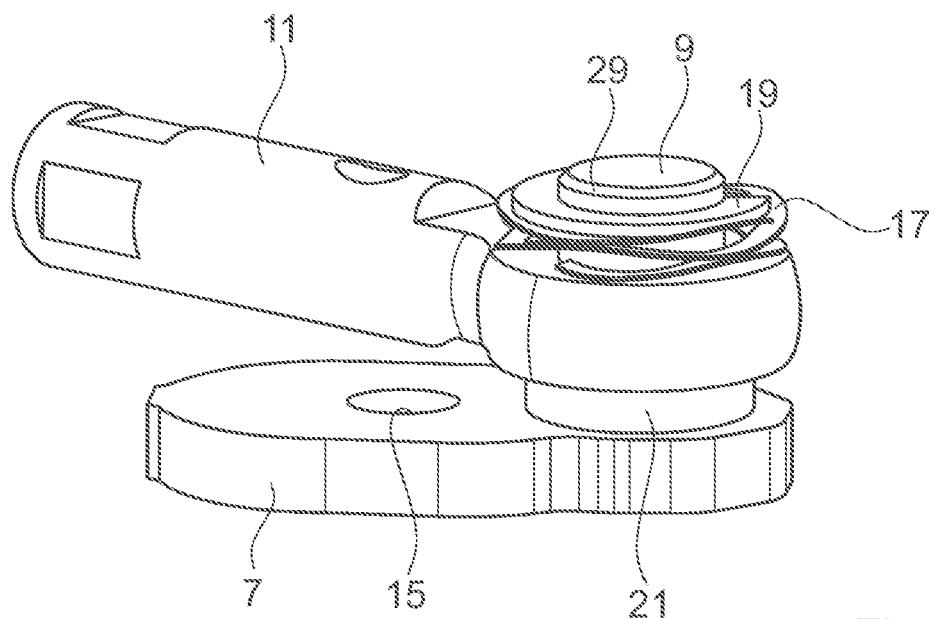
FIG. 3 is a three-dimensional illustration of a further exemplary embodiment of a turbocharger actuator arrangement.

FIG. 3 is a three-dimensional illustration of a second exemplary embodiment of a turbocharger actuator arrangement having an actuator operating lever 7 and an end piece of a control rod 11. In order to avoid repetitions, the description will concentrate on differences in relation to the preceding exemplary embodiment.

In this exemplary embodiment, the wave spring 17 is arranged between the control rod 11 and the bolt securing means 19. Nevertheless, it is also the case in this exemplary embodiment that the bolt 9 has a flange-like widened first region 21 on the actuator operating lever 7. This first region 21 supports the control rod 11, such that direct contact, and the associated friction and wear, between the control rod 11 and the actuator operating lever 7 are avoided. Furthermore, contact between the control rod 11 and the shaft to which the actuator operating lever 7 is fastened is also prevented. The diameter of the wave spring 17 corresponds to the diameter of the second region 27. The end region 25 of the bolt 9 has a bevel 29 or rounded portion in order to facilitate in particular the mounting and the centering of the wave spring 17 during the assembly process. The wave spring 17 is preloaded between the bolt securing means 19 and the control rod 11, such that the axial play between the actuator operating lever 7 and the control rod 11 is reduced or even eliminated by virtue of the control rod 11 being pushed onto the first region 21.

Figure 4:
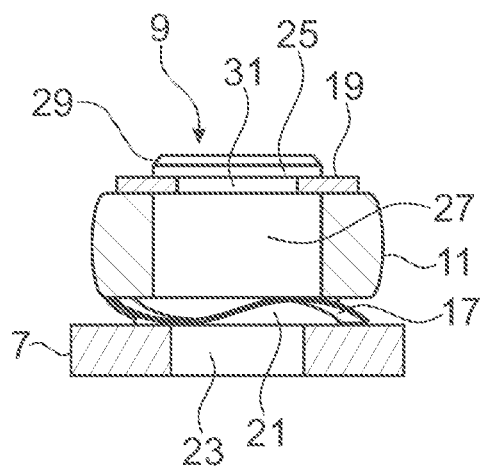
FIG. 4 is a partial sectional view of a connecting region of control rod and actuator operating lever of an exemplary embodiment of a turbocharger actuator arrangement.

FIG. 4 is a partial sectional view of the connecting region of control rod 11 and actuator operating lever 7 of an exemplary embodiment of a turbocharger actuator arrangement. The actuator operating lever 7, the control rod 11 and a bolt securing means 19 are illustrated in section.

In this exemplary embodiment, the wave spring 17 is arranged between the control rod 11 and the actuator operating lever 7.

The bolt 9 is fixedly connected to the actuator operating lever 7 by virtue of a foot 23 of the bolt 9, with a circular cylindrical shape, engaging into a corresponding opening of the actuator operating lever 7. The fixed connection between the components may be realized for example by means of an interference fit. Between the foot 23 and an end region 25 at which the bolt securing means 19 is arranged, the bolt 9 has a first region 21 adjacent to the actuator operating lever 7, which first region runs through the wave spring 17, and a second region 27, which runs through the securing rod 11. The end region 25 is beveled or rounded in order to facilitate the assembly process. Both the first and the second region 21, 27 have a circular cylindrical basic shape. The diameter of the second region 27 is smaller than the diameter of the first region 21, wherein both diameters are larger than the diameter of the foot 23. The second region 27 is delimited axially by a radially fully or partially encircling groove 31, in which the bolt securing means 19, configured as a securing disk, engages.

In this exemplary embodiment, the wave spring 17 is formed from a single layer composed of a flat wire running in a ring shape. The wave spring 17 may have a closed ring shape. Alternatively, a gap may be provided between the ends thereof, or the ends overlap.

Figure 5:
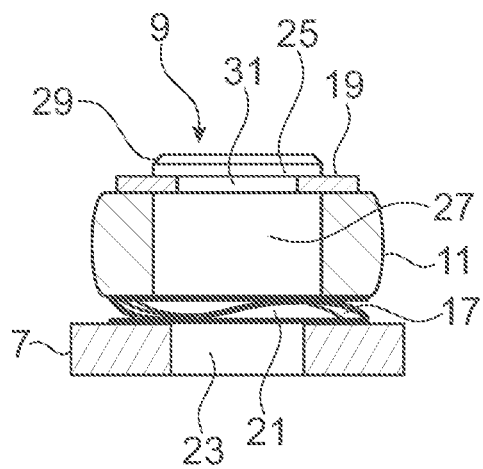
FIG. 5 is a partial sectional view of a connecting region of control rod and actuator operating lever of a further exemplary embodiment of a turbocharger actuator arrangement.

FIG. 5 is a partial sectional view of the connecting region of control rod 11 and actuator operating lever 7 of a further exemplary embodiment of a turbocharger actuator arrangement. The actuator operating lever 7, the control rod 11 and a bolt securing means 19 are illustrated in section.

This exemplary embodiment differs from the preceding exemplary embodiments in that the wave spring 17 has outer windings in parallel planes, such that the outer end windings at the top side and bottom side have no undulations, and run parallel. The layer running in between has undulations. By means of the end windings that lie flat against the control rod 11 and against the actuator operating lever 7, the spring forces are distributed uniformly, and undulation peaks or troughs are prevented from possibly pressing into the adjacent components. In an alternative embodiment, multiple layers with undulations may be provided between the flat outer windings.

Figure 6:
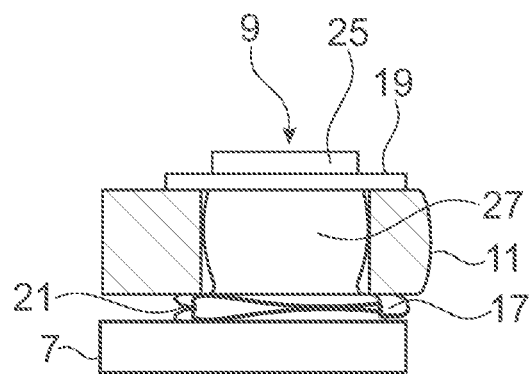
FIG. 6 is a partial sectional view of a connecting region of control rod and actuator operating lever of a yet further exemplary embodiment of a turbocharger actuator arrangement.

FIG. 6 is a partial sectional view of the connecting region of control rod 11 and actuator operating lever 7 of a yet further exemplary embodiment of a turbocharger actuator arrangement. The actuator operating lever 7 and the control rod 11 are illustrated in section.

This exemplary embodiment differs from the two preceding exemplary embodiments by the type of wave spring 11 and the shape of the bolt 9.

The wave spring is of multi-layer form and has multiple layers of helically running undulating flat wire. This allows greater spring travels and easier adaptation to the available installation space between the actuator operating lever 7 and the control rod 11.

The second region 27 of the bolt, which runs through the control rod 11, is in this exemplary embodiment of crowned form, such that the second region 27 has a barrel shape with a diameter which decreases in the upward and downward directions. In the case of this shape, the friction between the bolt 9 and control rod 11 is low owing to the small contact surface.

The features specified above and in the claims and shown in the figures can be advantageously implemented both individually and in various combinations. The invention is not restricted to the exemplary embodiments described, but may be modified in various ways within the scope of the abilities of a person skilled in the art.

REFERENCE DESIGNATIONS

1 Turbocharger
3 Actuator
5 Setting element
7 Actuator operating lever
9 Bolt
11 Control rod
13 Lever
15 Installation opening
17 Wave spring
19 Bolt securing means
21 First region
23 Foot
25 End region
27 Second region
29 Bevel
31 Groove

What is claimed is:

1. A turbocharger actuator arrangement for a turbocharger, the turbocharger actuator arrangement comprising;
   a movable actuator operating lever,
   a control rod couplable to a setting element of the turbocharger and which is connected by a bolt to the actuator operating lever such that the control rod is arranged to be rotatable relative to the actuator operating lever, and
   a wave spring having an undulating form with alternating undulation peaks and troughs,
   wherein the bolt extends from the actuator operating lever through an opening in an end region of the control rod and through the wave spring, such that the control rod and the wave spring are arranged between the actuator operating lever and a bolt securing means, which is arranged at an end region of the bolt averted from the actuator operating lever,
   wherein the wave spring is arranged between the control rod and the actuator operating lever,
   wherein the bolt is fixedly connected to the actuator operating lever,
   wherein the bolt has a first region entirely between the control rod and the actuator operating lever and a second region between the first region and the end region, and the second region runs through the opening of the control rod, and the first region and the end region of the bolt are situated outside the opening of the control rod, and
   wherein a diameter of the second region is smaller than a diameter of the first region such that the bolt centers the wave spring.

2. The turbocharger actuator arrangement as claimed in claim 1, wherein the wave spring is formed as a single-layer wave spring or as a multi-layer wave spring.

3. The turbocharger actuator arrangement as claimed in claim 1, wherein the end region of the bolt averted from the actuator operating lever has a groove, and the bolt securing means is formed as a securing ring that engages into the groove.

4. The turbocharger actuator arrangement as claimed in claim 1, wherein the first region runs through the wave spring.

5. The turbocharger actuator arrangement as claimed in claim 4, wherein a diameter of the second region corresponds to a diameter of the wave spring, and a diameter of the first region corresponds to a diameter of the opening of the control rod.

6. The turbocharger actuator arrangement as claimed in claim 1, wherein the first region and/or the second region has a cylindrical or crowned shape.

7. A turbocharger comprising:
(A) a setting element configured to influence an operation of the turbocharger;
(B) a turbocharger actuator arrangement for the turbocharger, the turbocharger actuator arrangement comprising;
a movable actuator operating lever,
a control rod couplable to the setting element of the turbocharger and which is connected by a bolt to the actuator operating lever such that the control rod is arranged to be rotatable relative to the actuator operating lever, and
a wave spring having an undulating form with alternating undulation peaks and troughs,
wherein the bolt extends from the actuator operating lever through an opening in an end region of the control rod and through the wave spring, such that the control rod and the wave spring are arranged between the actuator operating lever and a bolt securing means, which is arranged at an end region of the bolt averted from the actuator operating lever,
wherein the wave spring is arranged between the control rod and the actuator operating lever,
wherein the bolt is fixedly connected to the actuator operating lever,
wherein the bolt has a first region entirely between the control rod and the actuator operating lever and a second region between the first region and the end region, and the second region runs through the opening of the control rod, and the first region and the end region of the bolt are situated outside the opening of the control rod, and
wherein a diameter of the second region is smaller than a diameter of the first region such that the bolt centers the wave spring, and
(C) an actuator configured to control the turbocharger by varying a position of, or moving, the actuator operating lever, wherein the control rod is coupled to the setting element of the turbocharger such that the variation of the position, or movement, of the actuator operating lever causes a variation of the position, or movement, of the setting element, and wherein the setting element is one out of the group comprising a bypass valve, a VTG cartridge and a regulating flap.

8. The turbocharger as claimed in claim 7, wherein the wave spring is in direct contact with the control rod.

9. The turbocharger actuator arrangement as claimed in claim 1, wherein the wave spring is in direct contact with the control rod.

* * * * *